United States Patent [19]

Page et al.

[11] Patent Number: 5,025,821
[45] Date of Patent: Jun. 25, 1991

[54] CANOPY FOR PLAYPEN

[76] Inventors: Dorothy R. Page, 435 Boston Rd., Sutton, Mass. 01527; Gerald G. Berg, 162 Ash St., Spencer, Mass. 01562

[21] Appl. No.: 447,896

[22] Filed: Dec. 8, 1989

[51] Int. Cl.⁵ ............................................. E04H 15/48
[52] U.S. Cl. .................................. 135/112; 135/109; 5/414; 256/25; 403/191; 403/235; 403/391
[58] Field of Search ................... 135/88, 105, 90, 109, 135/110, 112, DIG. 9; 5/97, 414, 416; 403/191, 235, 236, 391; 256/25, 26

[56] References Cited

U.S. PATENT DOCUMENTS

| | | | |
|---|---|---|---|
| 2,499,985 | 3/1950 | Cafiero | 403/191 X |
| 2,502,103 | 3/1950 | Puls . | |
| 2,555,220 | 5/1951 | Brown | 135/107 |
| 2,820,468 | 1/1958 | Park et al. . | |
| 2,881,778 | 4/1959 | Goldman . | |
| 2,958,084 | 11/1960 | Kenney | 5/97 X |
| 3,105,510 | 10/1963 | Demosthenes | 403/391 X |
| 3,341,096 | 9/1967 | Stanley | 5/97 X |
| 3,345,653 | 10/1967 | Mixon | 5/97 |
| 4,084,598 | 4/1978 | Rainwater | 135/DIG. 9 X |
| 4,683,902 | 8/1987 | Wilson | 135/105 |
| 4,703,769 | 11/1987 | Harrison, Jr. | 135/DIG. 9 X |
| 4,779,294 | 10/1988 | Miller | 5/414 |
| 4,790,340 | 2/1988 | Mahoney . | |
| 4,825,484 | 9/1987 | Riegel . | |
| 4,926,892 | 5/1990 | Osmonson | 135/109 X |

FOREIGN PATENT DOCUMENTS

| | | | |
|---|---|---|---|
| 526743 | 6/1931 | Fed. Rep. of Germany | 135/110 |
| 2434054 | 4/1980 | France | 135/88 |
| 0547601 | 11/1957 | Italy | 135/88 |

*Primary Examiner*—David A. Scherbel
*Assistant Examiner*—Lan Mai
*Attorney, Agent, or Firm*—Iandiorio & Dingman

[57] ABSTRACT

A playpen canopy for a playpen having elongated supporting members. The canopy includes a framework having elongated rods which extend generally alongside of the supporting members of the playpen, horizontal rods which are connected to the elongated rods, a sheet of flexible material which is attached to the horizontal rods for forming a roof for the playpen canopy and a plurality of connecting elements for releasably connecting the elongated rods of the canopy to the elongated supporting members of the playpen.

16 Claims, 6 Drawing Sheets

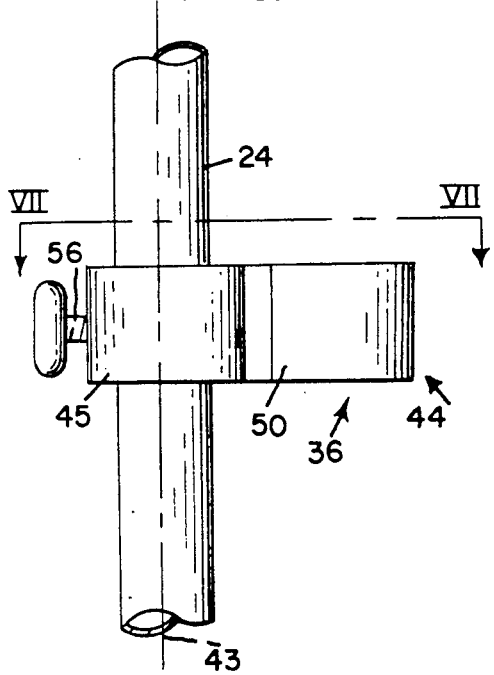
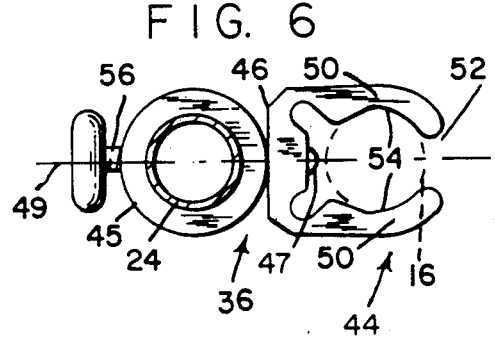
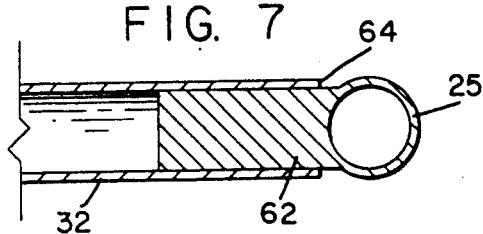

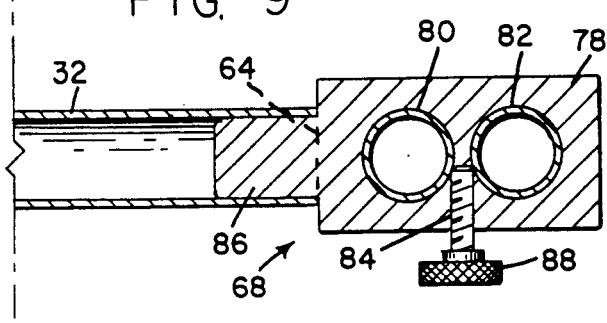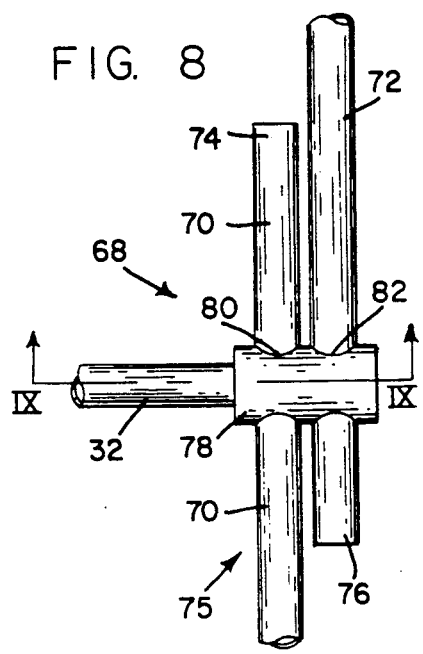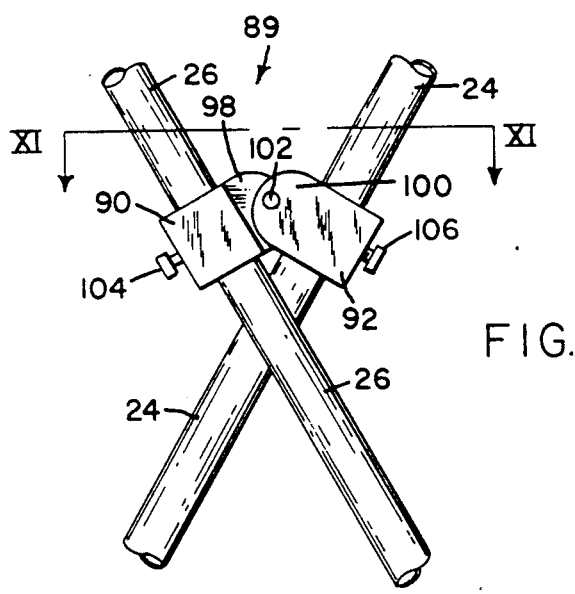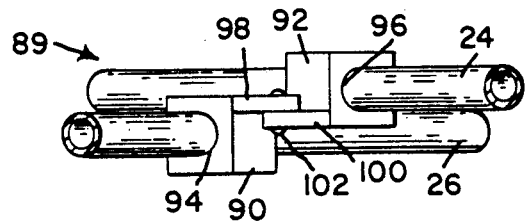

CANOPY FOR PLAYPEN

BACKGROUND OF THE INVENTION

The present invention relates generally to a canopy for a playpen for providing shade from sunlight to enable the playpen to be used outdoors and, more specifically, to a canopy which is releasably attachable to the framework of a conventional playpen.

Covers for canopies have been developed for playpens which are attachable to the upper peripheral edge of the pen, thereby essentially extending the top of the playpen. Although each prior art playpen is provided with an opening, the canopy adds to the confinement factor which is an inherent part of a playpen that is objectionable for most children. In addition, each canopy must be made specifically for each size and style of playpen. These and other difficulties experienced with the prior art playpen canopies have been obviated by the present invention.

It is, therefore, a principle object of the invention to provide a canopy which is attachable to playpens which vary substantially in size and shape.

Another object of this invention is the provision of a canopy which provides protection against the rays of the sun for outdoor use while not adding significantly to the confinement factor of the playpen.

A further object of the present invention is the provision of a canopy which is attachable to and removable from playpens with relative ease without the use of special tools.

It is another object of the present invention to provide a canopy for a playpen which is self-supporting in an operative position and is removably attachable to the framework of the playpen.

It is a further object of the invention to provide a canopy for a playpen which is simple in construction, which is inexpensive to manufacture, and which is capable of a long life of useful service with a minimum of maintenance.

With these and other objects in view, as will be apparent to those skilled in the art, the invention resides in the combination of parts set forth in the specification and covered by the claims appended hereto.

SUMMARY OF THE INVENTION

In general, the invention consists of a canopy for a playpen, the playpen having a framework which includes elongated supporting members which support the sides of the playpen. The canopy has a framework which includes horizontal rods which extend along the supporting members at the vertical side walls of the playpen for supporting a sheet of flexible material which forms the roof of the canopy and connecting elements for releasably connecting the elongated rods of the canopy to the elongated supporting members of the playpen. More specifically, each connecting element is a clamp which can be rotated about the longitudinal axis of the elongated rod, which can be rotated about an axis which is transverse to the central longitudinal axis of the elongated rod and which is slidable along the central longitudinal axis of the rod, thereby enabling the canopy to adapt to a wide range of playpen styles.

BRIEF DESCRIPTION OF THE DRAWINGS

The character of the invention, however, may be best understood by reference to one of its structural forms, as illustrated by the accompanying drawings, in which:

FIG. 5 is an enlarged fragmentary view of one of the connecting elements for connecting the canopy to the playpen, FIG. 6 is a horizontal cross-sectional view taken along the line VI—VI of FIG. 5 and looking in the direction of the arrows, FIG. 7 is a vertical cross-sectional view taken along the line VII—VII of FIG. 2 and looking in the direction of the arrows, FIG. 8 is a fragmentary plan view of the canopy, showing a first modification;

FIG. 9 is a vertical cross-sectional view taken along the line IX—IX of FIG. 8 and looking in the direction of the arrows, FIG. 10 is a fragmentary front elevational view of the canopy, showing a second modification, and FIG. 11 is a vertical cross-sectional view taken along the line XI—XI of FIG. 10 and looking in the direction of the arrows.

DETAILED DESCRIPTION OF THE INVENTION

Figure 1:
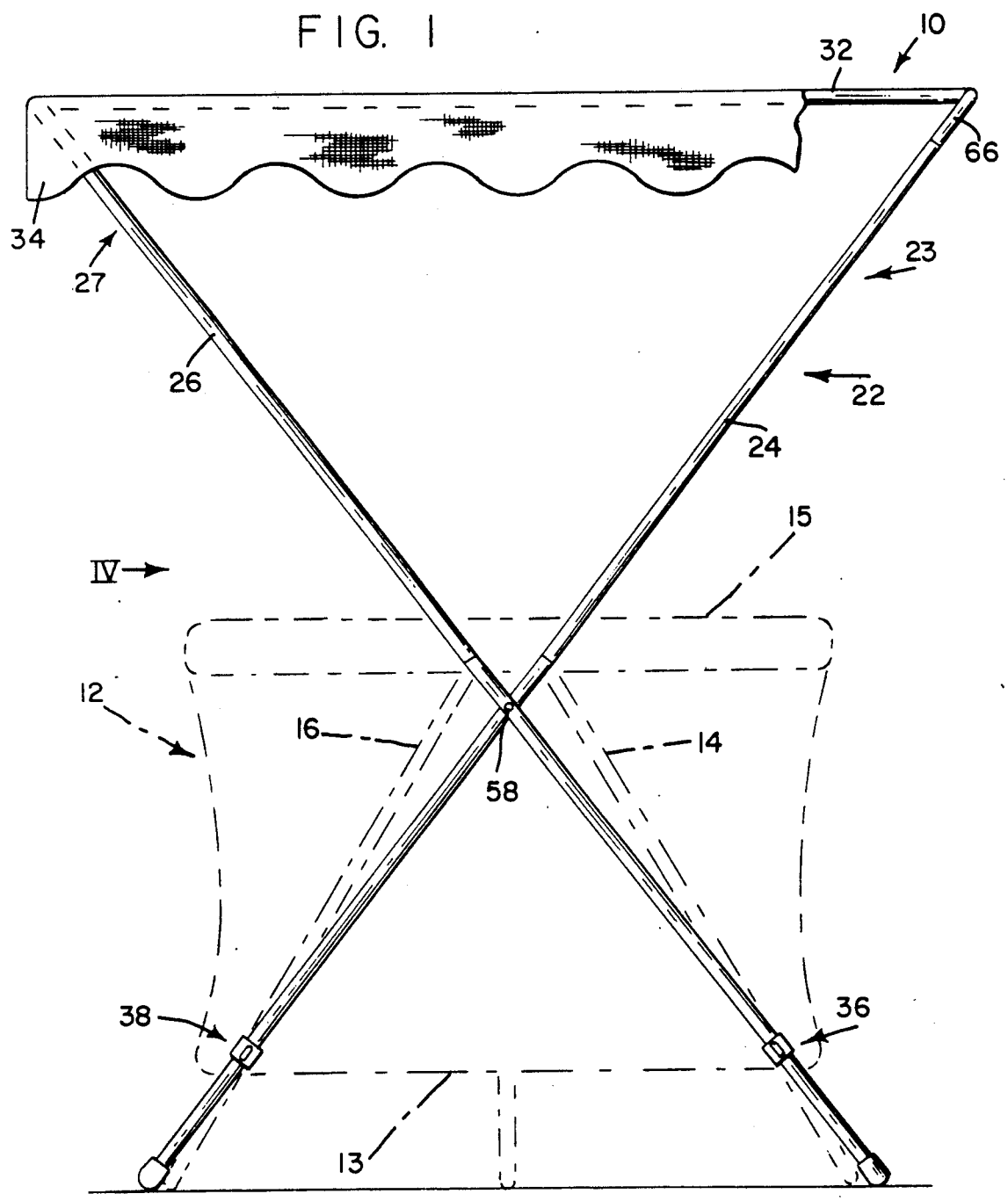
FIG. 1 is a front elevational view of a playpen canopy embodying the principles of the present invention.
Figure 2:
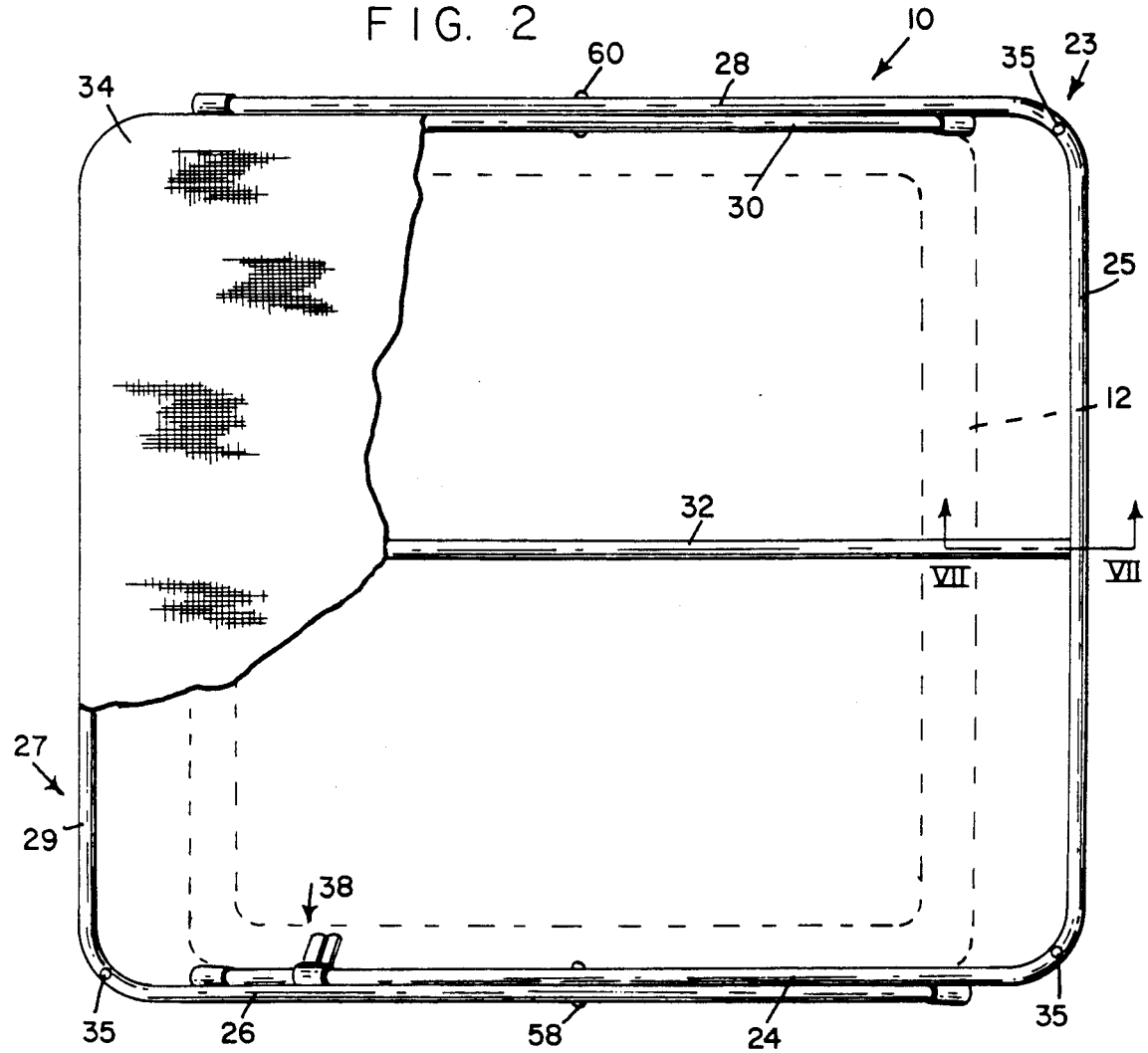
FIG. 2 is a top plan view of the canopy.
Figure 3:
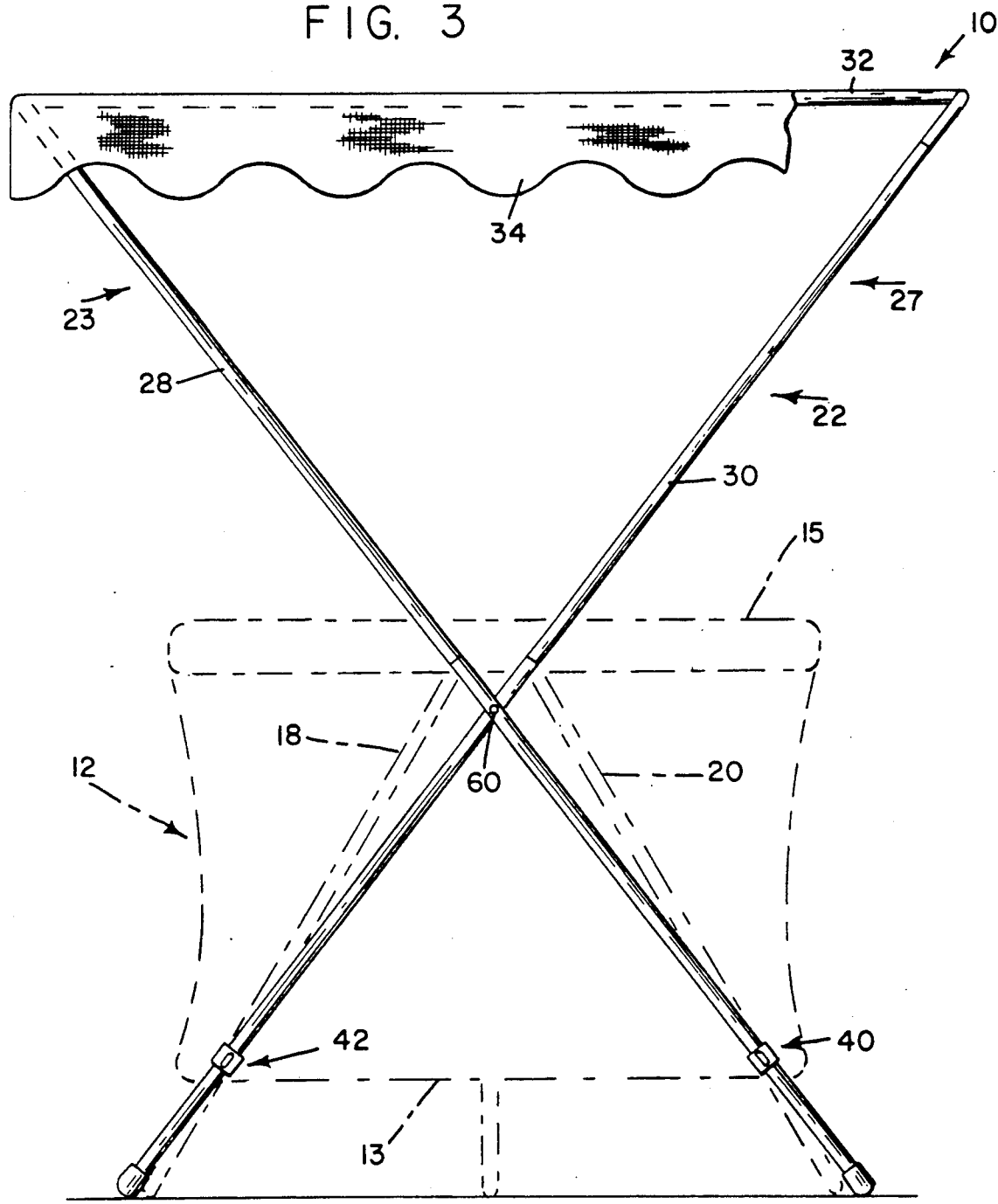
FIG. 3 is a rear elevational view of the canopy.
Figure 4:
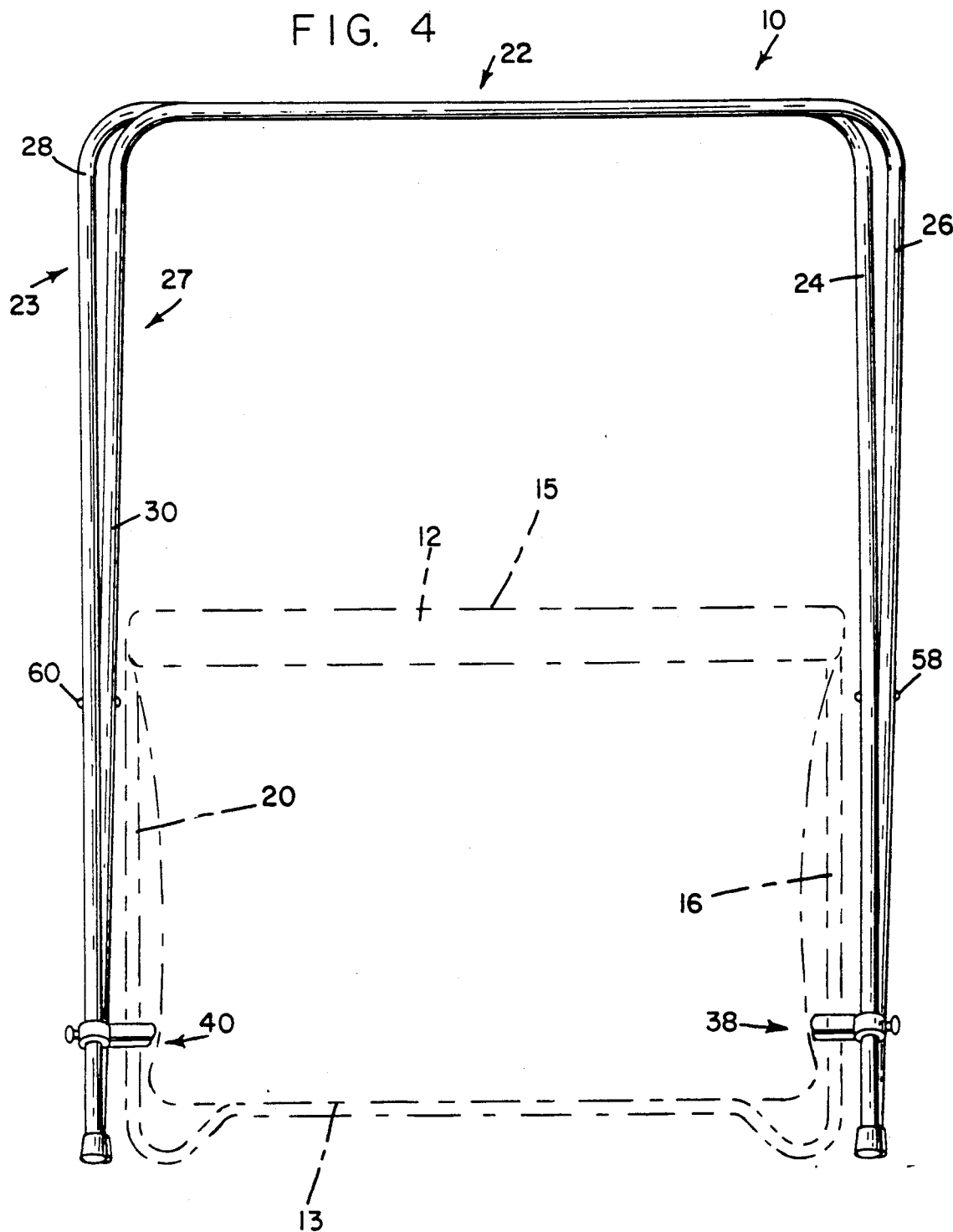
FIG. 4 is a side elevational view of the canopy looking in the direction of arrow IV of FIG. 1.

Referring first to FIGS. 1–4, the canopy of the present invention is generally indicated by the reference numeral 10 and is shown applied to a conventional playpen which is generally indicated by the reference numeral 12. The playpen 12 includes a framework which comprises first and second elongated supporting members 14 and 16, respectively, on one side of the playpen and third and fourth elongated supporting members 18 and 20, respectively, on the opposite side of the playpen. The playpen has a bottom 13 and a top peripheral edge 15. The supporting members 14–20 extend at an angle from the bottom 13 to the top peripheral edge 15 of the playpen as shown in FIGS. 1 and 3.

The canopy 10 includes a tubular framework, generally indicated by the reference numeral 22, which comprises a pair of U-shaped members 23 and 27, which support a cloth roof 34. The U-shaped member 23 consists of first and third elongated tubular rods 24 and 28 which extend in vertical planes on opposite sides of the playpen 12 and a first tubular horizontal rod 25 which connects the upper ends of the elongated rods 24 and 28. The U-shaped member 27 consists of second and fourth tubular elongated rods 26 and 30, respectively, which extend in vertical planes on opposite sides of the playpen 12 and a second tubular horizontal rod 29 which connects the upper ends of the second and fourth elongated rods 26 and 30 respectively. A third horizontal rod 32 is connected to the first and second horizontal rods 25 and 29 respectively, and stabilizes the framework 22. The cloth roof 34 is attached to the first and second horizontal rods 25 and 29, respectively. Each end of the horizontal rods 25 and 29 is provided with a snap fastener 35 which engage corresponding complementary snap fasteners, not shown, on the inside surface of the cloth roof 34.

Connecting elements, generally indicated by the reference numerals 36 and 38, are mounted on the first and second elongated rods 24 and 26, respectively. Connecting elements, generally indicated by the reference numerals 40 and 42, are mounted on the third and fourth elongated rods 28 and 30, respectively. The elements 36, 38, 40, and 42 are identical, the connecting element 36 being shown in greater detail in FIGS. 5 and 6. Referring to FIGS. 5 and 6, the connecting element 36 comprises a generally U-shaped clamp 44 which is pivotally mounted on a ring 45 by means of a pivot pin 47 for pivoting about an axis 49. The axis 49 is transverse to the longitudinal axis 43 of the first elongated rod 24. The U-shaped clamp 44 comprises a base 46 which engages the ring 45 and a pair of resilient legs 50 which extend outwardly from the base 46. The legs 50 define an opening 52 which is narrower than the elongated rods of the playpen and narrower than a widened intermediate area 54 between the legs 50. The ring 45 is slidably mounted on the elongated rod 24 for movement along the axis 43 and for rotation about the axis 43. This two-way movement of the ring 45 relative to the axis 43 together with the movement of the clamp 44 about the axis 49 provides a three-way adjustment for the clamp 45. This enables the clamp to align itself with the corresponding elongated supporting member of the playpen. This also enables the canopy to adapt to a substantial range of playpen designs. In other words, the orientation of the elongated rods of the canopy do not have to match the spatial orientation of the elongated supporting members of the playpen in order for the connecting elements 36, 38, 40, and 42 to clamp the elongated rods of the canopy to the supporting members of the playpen.

Referring particularly to FIG. 7, the third horizontal rod 32 is tubular with an opening 64 for each end of the rod. Each of the horizontal rods 25 and 29 has an inwardly extending projection 62 which extends through the opening 64 into the interior of the horizontal rod 32 as shown in FIG. 7. This connection enables the rod 32 to be removably mounted to the horizontal rods 25 and 29.

The first elongated rod 24 is pivotally connected to the second elongated rod 26 by means of a pivot pin 58. The third elongated rod 28 is pivotally connected to the fourth elongated rod 30 by means of a pivot pin 60. This pivotal connection between the two elongated rods of each of the two U-shaped members 23 and 27, in addition to the removability of the third horizontal rod 32, enables the framework 22 to be folded into a flat compact structure. Preferably, each of the elongated rods 24, 26, 28, and 30 consists of two separate parts to enable the framework to be broken down into even smaller sections to form a compact package which can be stored easily during non-use. The first portion of each elongated rod extends from the bottom of the rod to a point just above the point where it is pivotally connected to the adjoining elongated rod. The second portion of the elongated rod begins from a point above the pivotal connection to a point just below the horizontal portion of the U-shaped member. Each end of the upper portion of each elongated rod is reduced in diameter. One end of the upper portion of the elongated rod fits into the interior of the lower portion of the rod and the other end of the upper portion of the elongated rod fits into a short descending portion 66 of the corresponding horizontal rod.

Referring to FIGS. 8 & 9, there is shown a modified U-shaped frame member, generally indicated by the reference numeral 68. The U-shaped frame member 68 is identical to the U-shaped member 23 described above except that the upper horizontal portion of the U-shaped frame member 68 is adjustable in length to accommodate playpens of different widths. The upper horizontal rod portion of the U-shaped member 68 is generally indicated by the reference numeral 75 and consists of two separate sections 70 and 72 and a connector 78. The section 70 has a free end 74 and the section 72 has a free end 76. The connector has a pair of spaced horizontal bores 80 and 82 and a vertical threaded bore 84 which intersects the bores 80 and 82. The rod sections 70 and 72 extend through the bores 80 and 82, respectively in a sliding fit so that they can be moved axially in opposite directions to increase or decrease the overall length of the horizontal rod 75. A locking screw 88 is threaded into the threaded hole 84 to clamp the sections 70 and 72 at a desired setting. The connector 78 has a projection 86 which extends into the opening 64 of the third horizontal rod 32. The opposite U-shaped member of the frame, not shown, is identical to the member 68 so that the length of both U-shaped members can be adjusted equally to accommodate a playpen of a specific width.

Referring to FIGS. 10 & 11, there is shown a second modification involving the U-shaped members of the frame. The U-shaped members of the frame of the second embodiment of FIGS. 10 and 11 are identical to the embodiment shown in FIG. 1, except that the pivoting axis of the elongated side portions of the U-shaped members is adjustable. FIGS. 10 and 11 show one side of the frame, it being understood that the opposite side of the frame is identical to that shown. The modified pivoting means is generally indicated by the reference numeral 89 and comprises a pair of brackets 90 and 92. The bracket 90 has a bore 94 and the bracket 92 has a bore 96. The second elongated rod 26 extends through the bore 94. The first elongated rod 24 extends through the bore 96. The bracket 90 has a flange 98. The bracket 92 has a flange 100. The flanges 98 and 100 extend toward each other so that they overlap and are pivoted together by a pivot pin 102. The flanges 98 and 100 are located between the central longitudinal axis of the elongated rods 24 and 26 to enable the rod 26 to extend in front of the rod 24, as shown in FIGS. 10 and 11. The brackets 90 and 92 can slide along the rods 26 and 24, respectively, to vary the vertical position of the pivot pin 102 and thereby effectively change the point of pivoting of the rods 26 and 24. This changes the angle of each rod 26 and 24. The brackets 90 and 92 are clamped to a desired position by locking screws 104 and 106 respectively. The locking screw 104 is threaded into a threaded hole in the bracket 90 which intersects the bore 94. The screw 106 is threaded into a threaded hole in the bracket 92 which intersects the bore 96. The ability to change the effective pivot point of the elongated rods at the front and at the back of the frame enable the rods to change their angular position. Since the top horizontal length of the frame remains the same, the lower portions of the elongated rods move toward or away from each other on each side of the frame as the pivot point is moved up or down. This provides additional versatility to the frame to accommodate variabilities in the angular orientation and positioning of the elongated supporting members for different styles of playpens. The modified pivoting means 89 can also be combined with the modification of FIGS. 8 and 9 to provide a frame which has maximum versatility.

Clearly, minor changes may be made in the form and construction of the invention without departing from the material spirit thereof. It is not, however, desired to confine the invention to the exact form herein shown and described, but it desired to include all such as properly come within the scope claimed.

The invention having been thus described, what is claimed as new and desired to be secured by Letters Patent is:

1. A playpen canopy for a playpen having a bottom and a top peripheral edge and a framework which includes first and second elongated supporting members which extend from said bottom to said top peripheral edge in a first vertical plane at one side of the playpen and a third and fourth elongated supporting members which extend from said bottom to first top peripheral edge in a second vertical plane at a side of said playpen opposite said one side, said playpen canopy comprising:
   (a) a framework comprising first and second elongated rods which extend upwards and cross at an angle proximate said first vertical plane and which are adjacent said first and second elongated supporting members, respectively, third and fourth elongated rods which extend upwards and cross at an angle proximate said second vertical plane and which are adjacent to said third and fourth elongated supporting members, respectively, and a plurality of horizontal rods which are operatively connected to said first, second, third and fourth elongated rods to provide a playpen canopy roof framework,
   (b) a sheet of flexible material attachable to said horizontal rods for forming a roof for said playpen canopy, and
   (c) a plurality of connecting elements attached intermediate the ends of the respective elongated rods for releasably connecting said first, second, third and fourth elongated rods of said framework to the first, second, third and fourth elongated supporting members for removably connecting the playpen canopy framework to the outside of the playpen to provide a free-standing, removable playpen canopy.

2. A playpen canopy as recited in claim 1, wherein said first and third elongated rods are parallel and said second and fourth elongated rods are parallel and, wherein said horizontal rods comprise:
   (a) a first horizontal rod which is fixed at one end to the upper end of said first elongated rod and at its other end to the upper end of said third elongated rod, thereby forming a first U-shaped frame element,
   (b) a second horizontal rod which is fixed at one end to the upper end of said second elongated rod and at its other end to the upper end of said fourth elongated rod, thereby forming a second U-shaped frame element, and
   (c) a third horizontal rod which is connected at one end to said first horizontal rod and connected at its other end to said second horizontal rod, thereby connecting said first U-shaped frame element to said second U-shaped frame element.

3. A playpen canopy as recited in claim 2, wherein said third horizontal rod is removably connected to said first and second horizontal rods.

4. A playpen canopy as recited in claim 3, wherein said first horizontal rod has a first projection which extends laterally of said first horizontal rod and horizontally toward said second horizontal rod, said second horizontal rod having a second projection which extends laterally of said second horizontally rod and horizontally toward said first horizontal rod and, wherein each end of said third horizontal rod has an opening which extends inwardly a substantial distance from the end of the rod for removably receiving one of said first and second projections.

5. A playpen canopy as recited in claim 2, wherein each of said first and second horizontal rods are adjustable in length to adjust the length of said framework to allow the canopy to be releasably connected to playpens of different lengths.

6. A playpen canopy as recited in claim 5, wherein each of said first and second horizontal rods has two sections, each of said sections having a free inner end, each of said first and second horizontal rods adjustable in length by an adjusting means comprising:
   (a) a connector which has a pair of spaced parallel bores for receiving said free inner ends in a sliding fit.

7. A playpen canopy as recited in claim 6, wherein the connector for each of said first and second horizontal rods has a projection which extends laterally of said horizontal rods toward the opposite projection and, wherein each end of said third horizontal rod has an opening which extends inwardly a substantial distance from the end of the rod for removably receiving one of said projections.

8. A playpen canopy as recited in claim 1, wherein each of said connecting elements comprises a generally U-shaped clamp which has a base which is mounted on its corresponding elongated rod and a pair of resilient legs which extend from the base laterally of the elongated rod to define an outer opening for receiving one of the supporting members of the playpen.

9. A playpen canopy as recited in claim 8, wherein an intermediate area between said legs is substantially wider than said opening.

10. A playpen canopy as recited in claim 8, wherein the base of each said clamps is mounted for pivoting about an axis which is transverse to the central longitudinal axis of the elongated rod to which said clamp is mounted for providing clamping to playpen supporting members of different angles to the vertical.

11. A playpen canopy as recited in claim 8, wherein each of said connecting elements comprises a ring which mounted on said elongated rod for rotation about the central longitudinal axis of said elongated rod, and wherein the base of said clamp is mounted on said ring for pivoting about an axis of which is transverse to the central longitudinal axis of said elongated rod.

12. A playpen canopy as recited in claim 11, wherein said ring is slidably mounted on said elongated rod for movement along the central longitudinal axis of the elongated rod.

13. A playpen canopy as recited in claim 12, wherein said clamp has a locking element for releasably fixing said clamp in a selected position on said elongated rod.

14. A playpen canopy as recited in claim 1, wherein said first and second elongated rods are pivotally connected where they cross by a first pivoting means for pivoting about a horizontal axis and said third and fourth elongated rods are pivotally connected where they cross by a second pivoting means for pivoting about a horizontal axis.

15. A playpen canopy as recited in claim 14 in which said first and second pivoting means are adjustable along the length of the respective elongated rods to provide a movable pivot point to alter the angle at which the elongated rods cross to allow the canopy to accommodate different styles of playpens.

16. A playpen canopy as recited in claim 1, wherein each of said first and second pivoting means comprises:
 (a) a first bracket which is slidably mounted on one of the pivotally connected elongated rods,
 (b) means for releasably locking said first bracket on said one elongated rod,
 (c) a first bracket which is slidably mounted on the other of said pivotally connected elongated rods, said second bracket being pivotally connected to said first bracket for pivoting about a horizontal axis, and
 (d) means for releasably locking said second bracket on said other elongated rod, whereby the horizontal pivoting axis of each of said first and second pivoting means is vertically adjustable.

* * * * *